Figure 1:
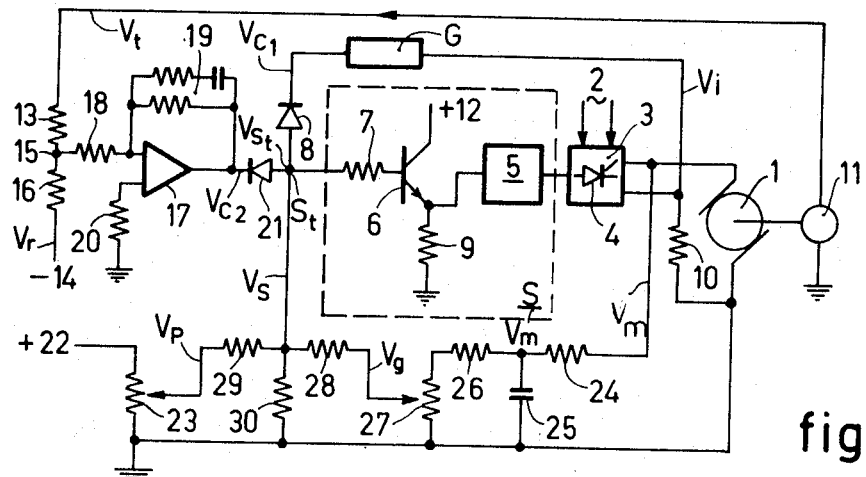

United States Patent
Nijhof et al.

[15] 3,707,660
[45] Dec. 26, 1972

[54] ARRANGEMENT FOR REGULATING THE CURRENT SUPPLIED TO THE OPERATIVE CIRCUIT OF A COMMUTATING MOTOR

[72] Inventors: Engbert Bernard Gerard Nijhof; Wilhelmus Bernardus Rosink, both of Emmasingel, Eindhoven, Netherlands

[73] Assignee: U.S. Philips Corporation, New York, N.Y.

[22] Filed: March 3, 1970

[21] Appl. No.: 16,201

[30] Foreign Application Priority Data

March 6, 1969 Netherlands .......................6903439

[52] U.S. Cl. ..................................318/308, 318/332
[51] Int. Cl. ............................H02p 5/28, H02p 7/36
[58] Field of Search.......318/331, 345, 434, 308, 332

[56] References Cited

UNITED STATES PATENTS 3,470,437  9/1969  Douglass ..............................318/345
3,252,069  5/1966  Ringrose..........................318/331 X
3,447,055  5/1969  Mason................................318/331

Primary Examiner—J. D. Miller
Assistant Examiner—Robert J. Hickey
Attorney—Frank R. Trifari

[57] ABSTRACT

A control system for a commutating electric motor includes at least one semiconductor controlled element for controlling the current in the operative circuit of the motor and a control device for adjusting the firing angle thereof. A negative feedback regulating voltage is supplied to the control device which depends upon the current in the operative circuit and/or upon the motor speed. Switching transients in the operative circuit are limited by means of a sum voltage composed of a bias voltage and a positive feedback voltage derived in an integrating positive feedback loop. The positive feedback voltage is determined by the voltage across the operative circuit. The switching transients are primarily determined by the bias voltage and the resistance of the operative circuit.

17 Claims, 3 Drawing Figures

PATENTED DEC 26 1972  3,707,660

INVENTORS
ENGBERT B. G. NIJHOF
WILHELMUS B. ROSINK
BY
Frank R. Trifari
AGENT

ARRANGEMENT FOR REGULATING THE CURRENT SUPPLIED TO THE OPERATIVE CIRCUIT OF A COMMUTATING MOTOR

The invention relates to an arrangement for regulating the current supplied to the operative circuit of a commutating electric motor, in particular to the rotor of a commutator motor, by means of at least one controlled element and of a device for controlling this element.

Such arrangements are known, for example, from U.S. Pat. specification No. 3,252,089.

As is known, for example, from German Pat. specification No. 1,143,567, it is common practice to stabilize the speed and/or the driving torque of a motor with respect to variations of the load or brake torque and/or of the supply voltage by means of a negative feedback voltage proportional to the speed and/or a voltage proportional to the current in the operative circuit of the motor, which are applied to the control device.

In a motor regulating arrangement such a stabilizing negative feedback is not capable of preventing unacceptably high current transients which occur when the motor is switched on, for example with the rotor stationary and either loaded or unloaded and in the case of a prescribed speed of rotation or by switching from braking to accelerating or vice versa. At start-up the negative-feedback voltage proportional to the speed is completely absent, as is the negative-feedback voltage proportional to the current in the operative circuit, so that the controlled element is fully driven by the control voltage which prescribes a given speed, and, when the operative circuit of the motor has a small impedance, applies the full supply voltage to this circuit. Subsequently, the amount of drive to the controlled element is reduced by the negative voltage and/or current feedback so that the speed of the motor tends to the prescribed or preset value at a gradually decreasing rate.

It is an object of the present invention to limit the described switching transients that may occur in a regulating arrangement of the afore-defined type may be detrimental to the operative circuit of the motor, for the supply voltage source and/or for the controlled element, without a decrease in the control velocity obtainable with the arrangement and the motor. For this purpose the invention utilizes a linear control device, i.e., a control device such that the mean value of the voltage applied through the controlled element to the load, in the case under consideration to the operative circuit of the motor, is proportional to a control voltage applied to this control device. Such control devices are known and have been described, for example, in French Pat. specification No. 1,348,552.

However, the arrangement according to the invention is characterized in that this control voltage comprises composed a sum voltage of a chosen bias voltage, of a mean voltage which causes positive feedback and is derived from a measuring voltage taken across the operative circuit of the motor and of a regulating voltage which causes negative feedback and depends upon the current in the operative circuit and/or upon the rotational speed of the motor so that with the rotor of the motor stationary, and in the absence of a regulating voltage, the switching-on transient of the operative circuit current is determined by the magnitude of the bias voltage and by the resistance of the operative circuit.

Preferably the mean voltage is derived from the voltage measured across the operative circuit of the motor through an integrating network.

Figure 2:
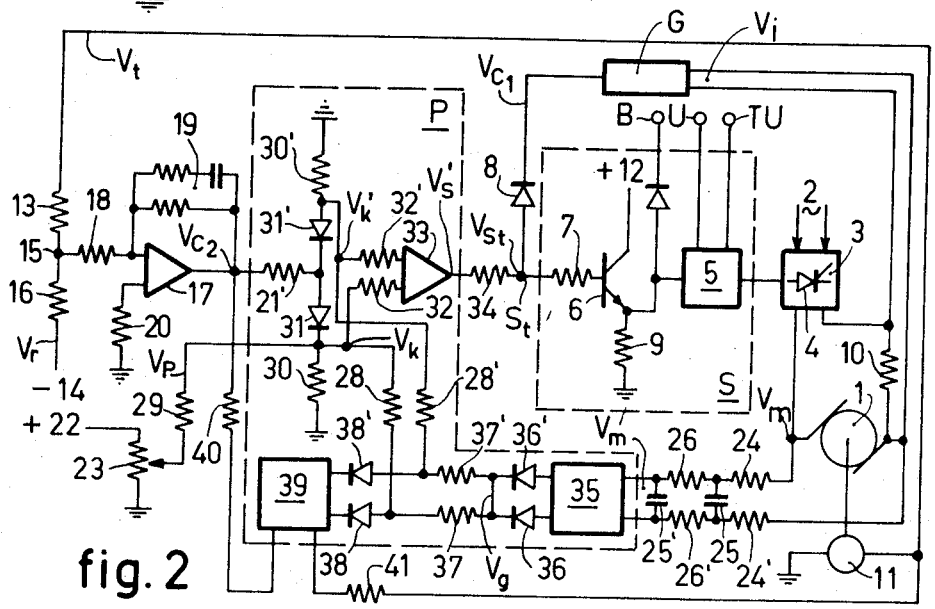
Figure 3:
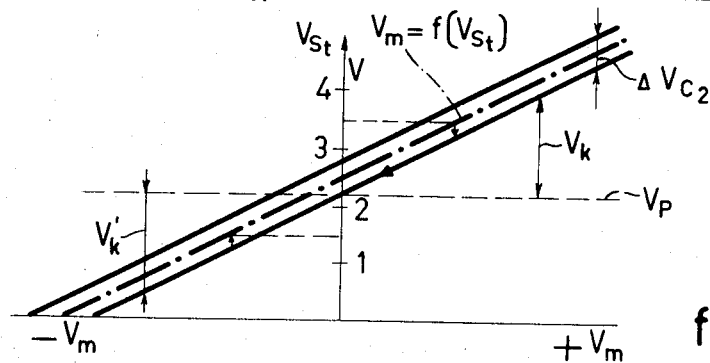

Embodiments of the invention will now be described, by way of example, with reference to the accompanying diagrammatic drawings, in which:

FIG. 1 is a schematic diagram, partly in block form, of a first embodiment of the arrangement according to the invention, FIG. 2 is a similar circuit diagram of a second embodiment and, FIG. 3 is a graph illustrating the operation of the second embodiment.

Referring now to FIG. 1, the operative circuit, in this case the rotor circuit 1, of a commutator motor is fed by a supply voltage source 2, for example, an alternating-voltage source having a rated voltage of 220 volts and a frequency of 50 Hz, through a rectifier circuit 3 which includes at least one controlled element in the form of a controlled rectifier 4, for example, a semiconductor controlled rectifier bridge. In addition to this controlled element or elements, the regulating device for the motor including the rotor 1 comprises a control device S which is partially represented by a block 5 and which further comprises an input stage having an n-p-n transistor 6 operating in common collector configuration. The collector of this transistor is directly connected to the positive terminal +12 of a direct-voltage supply source, not shown, of, say, 12 volts. Its base is connected to an input terminal $S_t$ through a resistor 7 and its emitter is connected to earth through a load resistor 9, across which the control voltage for the part 5 of the control device S is produced by the emitter current of the transistor 6.

The control device S is designed so that the entire regulating arrangement including this control device and the rectifier circuit 3 is linear, i.e., the mean rectified voltage applied across the rotor 1 is proportional to the control voltage between the input terminal $S_t$ and earth. This also can be obtained with an alternating-voltage supply source also, this is in a variety of manners, for example, as has been described in French Pat. specification No. 1,348,552, by always triggering the control rectifier 4 at the instant at which a signal analogous to the variations of the mean value of the voltage across the load as a function of the triggering phase angle of this rectifier becomes equal to the respective control voltage, at least in respect of the absolute values.

The motor is provided with an energizing element, not shown, for example a permanent magnet or a stator armature carrying an energizing winding supplied by a separate rectifier.

An increase of the current in the operative circuit of the motor to a value exceeding a given preadjustable value is counteracted by a first negative-feedback loop including a direct-voltage amplifier G which is provided with an adjustable threshold and by means of which a voltage $V_i$ across a small current-measuring resistor 10, connected in series with the rotor 1, is amplified and transmitted with inverse polarity to the input terminal $S_t$, through a rectifier 8, whenever this voltage exceeds the threshold.

The speed of the rotor 1 is stabilized to a desired value by means of a tachometer generator 11 which is driven by the rotor 1. This is effected by comparing a positive voltage $V_t$ generated by the tachometer generator 11, one terminal of which is connected to earth, through a second negative-feedback loop 13, with a negative reference voltage $V_r$ which is supplied by a direct-voltage source −14. The reference voltage is applied to a comparison point 15 through a resistor 16. The junction point 15 of the resistors 13 and 16 is connected through a third resistor 18 to one of the input terminals of a differential amplifier 17. The other input terminal of this inverting amplifier, which is provided with a negative-feedback network 19, is connected to earth through a resistor 20. The output terminal of the amplifier is connected to the input terminal $S_t$ through a rectifier 21.

For the present explanation it will be assumed that a third feedback loop, to be described hereinafter, is absent, that the rectifier 21 is replaced by a direct connection, that the rotor 1 is stationary and that the alternating-voltage supply source 2 is suddenly switched in, while a negative reference voltage $V_r$, corresponding to a high speed, is present.

Under these circumstances the control voltage $V_{S_t}$ is large and equal to $-k \times V_r$ since both the first negative-feedback voltage $k_1 \times V_t$ and the second negative-feedback voltage $k_2 \times V_t$ initially are equal to zero the input voltage of the amplifier 17 then is equal to the reference voltage $V_r$. The control device S controls the rectifier circuit 3 so that it delivers the maximum voltage to the operative circuit 1, 10, i.e., the phase control of the phase angle is substantially equal to zero and each forward half cycle of the voltage supplied by the source 2 is supplied substantially in its entirety to the operative circuit. Thus, a starting transient will be produced which counteracts itself through the first negative-feedback loop including the current measuring resistor 10 and the amplifier G, so that this transient will be of short duration and the operative-circuit current $I_1$ will then rapidly decrease and be stabilized to an adjustable, much smaller value, for example, a value equal to that of the maximum permissible motor current.

The impedance of the stationary rotor 1 is very small so that the amplitude of the first transient current flow through this rotor and the rectifier circuit 3 may reach an unacceptably high value for which the operative circuit of the motor is not proportioned and which may in particular damage or even destroy the controlled rectifier or rectifiers 4 of the rectifier circuit 3. Many rectifier circuits, and especially the commonly used so-called semiconductor rectifier bridge circuit having one controlled rectifier and one non-controlled rectifier in each alternating-current branch, include a freewheel diode which in the case of an at least partially inductive load is necessary to ensure commutation even at small phase angles. If the rectifier circuit 3 includes such a freewheel diode, the rotor current may still be considerable at the instant of the next triggering of a controlled rectifier 4 and may build up to an even higher peak value during the conductive period of this rectifier. The current-limiting negative-feedback loop G, 10 has a natural delay time of the order of magnitude of, say, 0.1 second, enabling the rotor current to build up to increasingly higher peak values during five or six cycles of a 50 Hz alternating voltage. When the rotor 1 starts rotating the control voltage $V_{S_t}$ is reduced through the second negative-feedback loop since the negative voltage at the point 15 is influenced by the positive voltage supplied by the tachometer generator 11. Therefore, the control voltage becomes smaller than the reference voltage $V_r$. As a result the rotor 1 can only reach the preset speed comparatively slowly and "asymptotically."

When the prescribed direction of rotation of the motor or the sign of its torque is suddenly changed, for example, by interchanging the connections between the rectifier circuit 3 and the operative circuit 1 or by reversing the energizing field, comparable transients will occur and the desired ultimate operating condition of the motor is again reached asymptotically and hence comparatively slowly.

According to the invention, the control voltage $V_{S_t}$ is constituted by a sum voltage $V_s$ composed of a bias voltage $V_p$ supplied by a bias voltage source +22 and of a mean voltage $V_g$ which provides positive feedback and is derived from a measuring voltage $V_m$ taken across the operative circuit 1 and by a regulating voltage which provides negative feedback and depends upon the current in the operative circuit 1 and/or upon the speed of the motor.

As the Figure shows, the bias voltage $V_p$ is taken from a potentiometer 23 which is fed by a direct-voltage source +22, a feedback voltage $V'_m$ being obtained by smoothing the measuring voltage $V_m$ across the operative circuit 1 by means of an integrating network comprising a series resistor 24 and a parallel capacitor 25. The mean voltage $V_g$ is taken from the tapping on a voltage divider comprising the series combination of a second series resistor 26 and a potentiometer 27. A sum voltage $V_s$ equal to a part of $V_p$ plus a part of $V_g$ is obtained by means of a resistance network comprising two series resistors 28 and 29 for supplying the voltages $V_g$ and $V_p$ and a parallel resistor 30 across which the voltage $V_{S_t}$ is ultimately produced, which is the most negative of the sum voltage $V_s$ and the components $Vc_1 = k_1 \cdot V_t$ and $Vc_2 = k_2(V_t - V_r)$ of the regulating voltage $V_c$.

Let it now be assumed that, with the positive feedback loop 24–28 and the isolating rectifier 21 present, the alternating voltage source 2 is suddenly switched into circuit with the rotor 1 stationary. The regulating voltage $V_c$ derived from $K_1 \cdot V_t$ and/or from $-k_2(V_t - V_r)$ is zero, because $V_t$ and $V_t$ are zero and $-k_2 - V_r = k_2 \cdot V_r$ cuts the rectifier 21 off $V_g = k_3 \cdot V'_m$ also is zero, so that the control voltage $V_{S_t}$ is equal to the sum voltage $V_s$ which is equal to $k_4 \cdot V_p$ and hence is proportional to the bias voltage $V_p$.

The control voltage $V_5$ at the input of the part 5 of the control device S consequently is equal to $k_4 \cdot V_p + k_5 \cdot V_g = k_4 \cdot V_p + k_3 \cdot k_5 \cdot V'_m$, the factors $k_4$ and $k_5$ being adjustable by means of the sliders of the potentiometers 23 and 27, respectively. Since the regulating function of the control device S is such that the mean output voltage $V_{o3}$ of the rectifier circuit 3 is a linear function of the control voltage $V_5$, we also have:

$V_{o3} = V_m = k_6 \cdot V_5$, so that:

$V_{o3} = V_m = k_4 \cdot k_6 \cdot V_p + k_3 \cdot k_5 \cdot k_6 \cdot V'_m$.

By means of the potentiometer 27, $k_3$ can be chosen so that $k_3 \cdot k_5 \cdot k_6 = 1$. Thus, $V_{o3} = V_m = k_4 \cdot k_6 \cdot V_p + V'_m$, and the operative-circuit current $I_1$ due to this voltage is:

$$I_1 = (k_4 \cdot k_6 \cdot V_p + V_m' - V_{EM1})/R_1 + p L_1$$

where $V_{EM1}$ is the back electromotive force across the operative circuit 1 and $R_1$ and $L_1$ are the resistance and the inductance, respectively, of this circuit.

If $L_1$ is comparatively large, the ripple component due to the sinusoidal shape of each half cycle of the rectified voltage $V_{o3}$ will be negligible.

At the instant at which the alternating-voltage source 2 is switched in, for example, by triggering pulses being applied to the controlled rectifier or rectifiers 4 of the rectifier circuit 3, $I_1 = 0$ and hence $V'_m = V_m = V_{EM1}$, so that the transient current will be:

$$I_{1_0} = (k_4 \cdot k_6 \cdot V_p)/R_1$$

Hence, the initial peck value of the transient does not depend upon the voltage $V_{o3}$ applied across the operative circuit 1 and can be preset by means of the potentiometer 23. Thus, any instability of the current due to the positive feedback through the loop 24–28 is prevented by the integrating effect of the smoothing network 24, 25. For this purpose, the time constant of this network has been made large enough for a build-up of the current $I_1$ by the positive feedback through the loop 24–28 to be immediately suppressed by the negative feedback through the first and/or the second negative-feedback loop G, 10 and/or 11 and 13–21. After switching in, the control voltage $V_{S_t}$ is equal to $k_4 \cdot V_p + k_3 \cdot k_5 \cdot V'_m$, or is determined by the regulating voltage component $V_{c1} = k_1 \cdot V_t$ derived from the operative circuit current, if this current exceeds the preset current limit (threshold) and renders the rectifier 8 conductive. The output voltage $V_{o3}$ of the rectifier circuit 3 remains equal to, or smaller than $k_4 \cdot k_6 \cdot V_p + V'_m$ until the speed of the rotor 1 of the motor has reached a given preselected value. The positive voltage $V_t$ of the tachometer generator 11 increases with the speed so that the voltage $V_t - V_r$ becomes less negative and the voltage $V_{c2} = -k_2(V_t - V_r)$ at the cathode of the rectifier 21 becomes less positive. When the latter voltage falls below the control voltage $V_{S_t} = k_4 \cdot V_p + k_3 \cdot k_5 \cdot V'_m$ or $V_{S_t} = k_1 \cdot V_t$ prevailing so far, the second negative-feedback loop 11 and 13 - 21 becomes operative owing to the rectifier 21 becoming conductive. This reduces the control voltage $V_{S_t}$ and hence the rectified voltage $V_{o3}$ and consequently stabilizes the speed of the rotor 1 to a value which is only slightly higher than that at which the rectifier 21 is rendered conductive and which is adjustable by varying the voltage of the source 14 and/or the value of the resistor 16.

The influence of the positive-feedback loop 24 – 28 and of the isolating rectifier 21 on the operation of the arrangement described has been discussed for the case in which a rectified supply voltage is suddenly applied to the operative circuit 1. The influence of these steps in the case of a sudden load change, for example, from maximum load to minimum load, or of a smaller load change, in the case of a collapse of the field voltage or of a change of the desired speed is analogous: a faster regulation is obtained together with a limitation of the transients due to any change in operating conditions to a preset value, and the entire arrangement is linear.

Owing to the transient limitation described normal protection of the important elements of the arrangement, in particular of the controlled rectifiers 4 of the rectifier circuit 3, for example, by means of conventional fuses, becomes possible. Further, rectifiers, especially controlled rectifiers having a smaller permissible peak current, may be used so that the rectifier circuit 3 will be cheaper.

If the rectifier circuit 3 is a completely controlled full-wave rectifier, for example, a completely controlled rectifier bridge, a freewheel diode can be dispensed with and the rectifier can operate as a DC-AC converter so that the motor may operate as a generator during braking. In this case the rectifier 21 is preferably replaced by a resistor through which a regulating voltage component equal to a proportional part of the voltage $-k_2 (V_t - V_r)$ is produced across the resistor 30. Through this resistor this regulating-voltage component is superposed on the sum voltage $V_s$ so that the operation of the entire arrangement will have an integrating nature. As a result the entire control action becomes more stable and sharply defined, and the transition from driving to braking and vice versa will be gradual.

The control voltage $V_{S_t}$ now is the smaller of the sum voltage $V_s$ with a superposed regulating-voltage component equal to a part of $-k_2 (V_t - V_r)$ and of the other, current-limiting regulating-voltage component $k_1V_t$.

Changing over from driving to braking and vice versa is considerably facilitated by the integrating behavior of the arrangement, and the speed stabilization is improved by the positive feedback.

In the second embodiment shown in FIG. 2, the rectifier circuit 3 comprises two fully controlled rectifiers, for example, two fully controlled rectifier bridges each consisting of four or six controlled rectifiers 4 (minus a freewheel diode) for regulating the current supplied to the operative circuit 1, 10 of a commutator motor or the current returned to the alternating-voltage source 2 by this operative circuit. As a result, both the value and the sense of the current in the operative circuit and the direction of rotation of the motor can be regulated without change in the polarity of the field energization.

The control device S substantially is a doubling of that shown in FIG. 1. It comprises a half unit for each fully controlled rectifier and it has three inputs U, TU and B to which signals are applied by a logic element, not shown, which is controlled by the output signal of the differential amplifier 17 and by the output signal of the first feedback loop 10, G, 8. The signal U causes triggering pulses to be applied to the control rectifiers of a first rectifier bridge corresponding to a first (clockwise) direction of drive, and the signal TU causes triggering pulses to be applied to the controlled rectifiers of the second rectifier bridge corresponding to the other (counterclockwise) direction of drive. The signal B prevents the application of triggering pulses to the controlled rectifiers of both rectifier bridges during the change-over from one driving direction to the other.

The first negative-feedback loop 10, G, 8 and the second negative-feedback loop 11 and 13 - 21 correspond to those of the first embodiment, with the difference that the rectifier 21 has been replaced by a resistor 21' so that the operation of the entire arrangement, also by the use of positive feedback, can assume an integrating nature.

The third feedback loop now includes a double RC filter comprising series resistors 24, 24' and 26, 26' and parallel capacitors 25 and 25'. Besides the elements +22, 23, 28, 29 and 30 already described with reference to FIG. 1, it includes a transformation and gate circuit P which has the function of superposing, in all operating conditions, the correct sum voltage $V_s$ on the second component $Vc_2$ at the output of the differential amplifier 17 and of applying the absolute value of the resulting voltage $V'_s$ to the control point $S_t$.

The sign of the voltage $V_m$ across the second filter capacitor 25' depends upon the direction of rotation of the rotor 1 and of the tachometer generator 11. However, for control purposes and as a feedback voltage $V_g$ its absolute value is required. Hence, the voltage $V_m$ is applied to the cross-connected input terminals of the two amplifiers of a double amplifier 35, the outputs of which are inter-connected through diodes 26 and 36', respectively.

According to the operating condition, the sum $V_s$ of the voltage $V_g$ at the cathodes of these diodes and of the bias voltage $V_p$ superimposed on the output voltage $Vc_2$ of the differential amplifier 17 is to be applied to one or to the other of the inputs of a transformation amplifier 33. For this purpose, the transformation and gate circuit P includes two parallel connected resistance networks 37, 28, 30, 32 and 37', 28', 30', 32', respectively. The resistors 37 and 37' are connected to the cathode of the diodes 36 and 36'. The junction points of the resistors 37 and 28 and of the resistors 37' and 28' are connected to the outputs of a change-over switch 39 through diodes 38 and 38', respectively. The junction point of the resistors 28, 30 and 32 is connected to the source +22, 23, 29 of bias voltage $V_p$ and to the cathode of a diode 31, the anode of which is connected to an output resistor 21' of the differential amplifier 17. The junction point of the resistors 37', 30' and 32' is connected to the anode of a diode 31', the cathode of which is connected to the same resistor 21'. The other ends of the resistors 30 and 30' are connected to earth, and the other ends of the resistors 32 and 32' are connected each to an input of the transformation amplifier 33. This is a double amplifier having an inverting input and a non-inverting input with a common output which is connected to the control point $S_t$ through a resistor 34. The change-over switch 39 is controlled through a resistor 40 by a first signal derived from the signal $V_{c2}$ at the output of the differential amplifier 17 and, through a resistor 41, by a second signal derived from a voltage $V_t$ generated by the tachometer generator 11.

If, for example, $V_{c2} = k_2 (V_r - V_t)$ is negative and $V_t$ is positive, the rotor 1 must be braked and hence the control voltage $V_{S_t}$ must be reduced, and the same is true when $V_{c2}$ is positive and $V_t$ is negative. In both cases the cathode of the diode 38 is grounded by the switch 39, whereas the cathode of the diode 38' is maintained at a positive potential, which cuts this diode off. As a result, the voltage $V_k$ applied to the cathode of the diode 31 through the feedback circuit is equal to the voltage $V_p$ taken from the bias-voltage source 22, 23, 29, while through the resistor 28' a voltage $V'_k = k \; |V_g|$ proportional to the absolute value of the mean voltage $V_g$ is applied to the anode of the diode 31' and, through the resistor 32', to the upper input terminal of the transformation amplifier 33.

If $V_{c2}$ and $V_t$ are both positive or both negative, the rotor 1 must be accelerated and the control voltage $V_{S_t}$ must be increased. In both cases the cathode of the diode 38' is grounded by the switch 39, whereas the cathode of the diode 38 is maintained at a positive potential so that this diode is cut off. Under these circumstances the voltage $V_k$ applied to the cathode of the diode 31 is equal to the sum $V_p + k \; |V_g|$ of the bias voltage $V_p$ and of the voltage proportional to the absolute value of the mean voltage $V_g$, while the voltage $V'_k$ applied through the resistor 28' is zero.

Under all operating conditions, a small regulating voltage $\Delta V_{c2}$ is superposed on the control voltage $V'_k$ or $V_k$ through the diode 31 or 31', so that the control voltage $V_{S_t}$ ultimately and as a function of a voltage $V_m$ across the rotor 1 shows the characteristic depicted by a dot and dash line in FIG. 3, while the control range which corresponds to each rectifier output voltage lies at a corresponding value of $V_m$ and between the full lines.

Similarly to the simpler arrangement shown in FIG. 1, the above-described arrangement limits the transient, which occurs when the rotor 1 is stationary, to a value which corresponds to a bias voltage $V_p$. By the provision of the positive-feedback loop the sudden current changes (due to the sudden changes in the operating conditions) are limited to an amplitude difference corresponding to the comparatively small regulating voltage $\Delta V_{c2}$ derived from the output voltage of the differential amplifier 17.

Owing to the integrating nature of the behavior of the entire arrangement not only the transition from driving to braking and vice versa, but also the transition from one direction of driving or braking to the other will be gradual and without appreciable transients. In the first case the difference between the tachometer generator voltage $V_t$ and the reference voltage $V_r$ and hence $V_{c2}$ and $\Delta V_{c2}$ will change sign, so that the control signal for the control device S changes from, say, 3.5 volts (FIG. 3) for driving in the positive (clockwise) driving direction to 3.2 volts corresponding to a rectifier output voltage smaller than the motor voltage $V_m$. Subsequently, the control is switched from one rectifier bridge to the other, with an associated temporary cut-off action by a signal applied to the point B, resulting in a maximum negative output voltage of the two controlled rectifiers, and by interchanging the signals applied to the inputs U and TU of the control device S. After this change-over the control signal $V_{S_t}$ is again increased by $V_p$ plus a negative contribution $V'_k$ to a value of 1.5 volts corresponding to the same speed in the opposite driving direction so that the rotor is braked.

Consequently, the motor voltage $V_m$ is reduced. If, for example, the reference voltage $V_r$ prescribes a reversal of the direction of drive, in the above-mentioned second case the motor is first braked to a stationary condition. When the speed passes through zero the tachometer voltage $V_t$ changes sign so that the first negative contribution $V'_k$ suffers a change in polarity with the result that the motor is accelerated to the preset speed in the other direction. If, now, the motor current $I_1$ exceeds a given preset value, it is limited to this value by the negative-feedback loop 10, G, 8, the amplitude of any motor current transients being limited by the value of the bias voltage $V_p$.

In any case, the stability of the entire arrangement is ensured by the fact that the time constant of the integrating network 24, 25 or 24, 24', 25, 26, 26', 25' of the positive-feedback loop is at least equal to that of a network 10, G, 8 or 11, 13 to 21 or 21' through which negative feedback is provided by a regulating voltage component $V_{c1}$ or $V_{c2}$.

Thus, when combined with a fully controlled rectifier, and especially with two fully controlled rectifiers, a gate and transformation circuit and a suitable logic the arrangement prescribed provides even more advantages than with a semicontrolled rectifier.

What is claimed is:

1. A motor control system including an arrangement for regulating the current supplied to the operative circuit of a commutating electric motor comprising, at least one controlled element for controlling the current supplied to said operative circuit, a control device for controlling said element and designed so that the mean value of the voltage applied to the operative circuit of the motor is proportional to a control voltage applied to said device, and means for deriving said control voltage comprising, means for producing a selected bias voltage, means for producing a positive feedback voltage which is a mean voltage derived from a measuring voltage developed across the operative circuit of the motor, means for combining the bias voltage and the mean voltage to derive a sum voltage, means for producing a negative feedback regulating voltage selectively proportional to the current in the operative circuit and on the speed of the motor, said regulating voltage and said sum voltage together constitute said control voltage so that, with the rotor of the motor stationary and in the absence of the regulating voltage, the switch-on transient of the operative circuit current is determined by the value of the bias voltage and by the resistance of the operative circuit.

2. An arrangement as claimed in claim 1, characterized in that the mean voltage is derived from the measuring voltage through an integrating network.

3. An arrangement as claimed in claim 2, wherein said regulating voltage producing means includes a feedback network through which a regulating voltage component provides a negative feedback and wherein the time constant of the integrating network is at least equal to that of said feedback network.

4. An arrangement as claimed in claim 1 wherein said means for producing a regulating voltage includes a negative feedback loop for deriving a component of the regulating voltage that is responsive to and increases with the current of the operative circuit.

5. An arrangement as claimed in claim 4, characterized in that said negative-feedback loop includes a voltage threshold device which is designed so that it produces an output voltage when its threshold is exceeded, and means responsive to said output voltage for limiting the value of the control voltage to a level determined by the value of the component of the regulating voltage which is derived from the operative circuit current.

6. An arrangement as claimed in claim 4 wherein a second component of the regulating voltage is derived from a voltage which is proportional to the rotor speed.

7. An arrangement as claimed in claim 5 further comprising a source of reference voltage which determines the rotor speed, and means for comparing the voltage proportional to the rotor speed with the reference voltage which determines the rotor speed thereby to derive said second component of the regulating voltage.

8. An arrangement as claimed in claim 5 further comprising a semicontrolled bridge rectifier circuit for supplying the current to the motor, and a rectifier connected in the arrangement so as to compare the sum voltage with the second component of the regulating voltage in a manner such that the control voltage is constituted by the smaller of these voltages.

9. An arrangement as claimed in claim 1 wherein a first component of the regulating voltage comprises a voltage which is derived from the operative-circuit current through a negative-feedback loop so that it increases therewith, means for deriving a second component of the regulating voltage that is proportional to the rotor speed, the negative-feedback loop being provided with a voltage threshold and being designed so that the value of the control voltage is limited by the value of that component of the regulating voltage which is derived from the operative-circuit current in a manner such that the control voltage is constituted by the smallest of the group of voltages comprising the sum voltage, the second component of the regulating voltage and the first component of the regulating voltage.

10. An arrangement as claimed in claim 5 further comprising, two fully controlled full-wave bridge rectifier circuits for supplying the current to the motor, and a resistor through which the second component of the regulating voltage is superimposed on the sum voltage so that the regulation of the current supplied to the operative circuit of the motor has an integrating nature.

11. An arrangement as claimed in claim 9 wherein the negative-feedback loop that derives the first component of the regulating voltage is provided with a voltage threshold and is designed so that the value of the control voltage is limited by the value of the first component of the regulating voltage, and means for combining said voltages in a manner such that the control voltage is constituted by the smaller of the sum voltage with the superimposed second component of the regulating voltage and the first component of the regulating voltage derived from the operative-circuit current.

12. An arrangement as claimed in claim 1 wherein the control device includes a transistor connected in the common collector configuration, and means for applying the sum voltage and the regulating voltage to the base of said transistor.

13. A control system for an electric motor comprising, means for producing a first negative feedback voltage that is dependent upon the motor current, means for deriving a bias voltage that determines the value of the motor current in the absence of said negative feedback voltage, means for deriving a positive feedback voltage which is dependent upon the motor voltage, and a control device responsive to said bias voltage and to said positive and negative feedback voltages for controlling the current supplied to the motor from a supply source as a composite function of said voltages.

14. A control system as claimed in claim 13 further comprising means for producing a second negative feedback voltage that is dependent upon the motor speed and supplying a speed voltage signal to said control device for controlling the motor current as a further function of said second negative feedback voltage.

15. A control system as claimed in claim 14 wherein said first and second negative feedback producing means include first and second feedback networks, respectively, and wherein said positive feedback deriving means includes an integrating network with a time constant that is at least equal to the time constants of said first and second feedback networks.

16. A control system as claimed in claim 14 further comprising a source of reference voltage that determines the motor speed, and means for comparing said reference voltage with the second negative feedback voltage to derive said speed voltage signal.

17. A control system as claimed in claim 14 wherein said positive feedback deriving means includes an integrating network and further comprising first and second isolation diodes respectively connected between said first and second negative feedback producing means and said control device.

* * * * *